Oct. 6, 1931.      G. A. HOLMES      1,826,281

FASTENER

Filed March 29, 1928

INVENTOR.
George A. Holmes,
By J. W. Cody,
his Attorney.

Patented Oct. 6, 1931

1,826,281

UNITED STATES PATENT OFFICE

GEORGE A. HOLMES, OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

FASTENER

Application filed March 29, 1928. Serial No. 265,750.

This invention relates to fasteners and more especially to snap fasteners.

Snap fasteners usually include a stud and a socket, the socket having resilient members for yieldingly gripping the head of the stud. In setting the studs in the work it is usual to insert the shank of the stud through the surface to which it is to be attached, and then to expand the end of the shank so as to anchor it securely in the work. This process requires the use of some kind of an expanding tool at the rear face of the work, and if it is impossible to obtain access to said face it is necessary to use some other method of anchoring the fastener in place. In such cases the usual method is to screw the shank of the stud into a tapped hole. This method, however, cannot be used unless there is considerable stock to take the threads.

The present invention deals more especially with those situations where a stud cannot be anchored by the methods above described. It is one of the objects of the invention to devise a stud which can readily be expanded from within. The invention also aims to devise a fastener having a closed bottom and which can be readily anchored in place.

The nature of the invention will be readily understood from the following description when read in connection with the accompanying drawings, and the novel features will be particularly pointed out in the appended claim.

The fastener shown comprises sheet metal head and shank members indicated in general at 2 and 3, respectively. The head may be of various forms but as shown consists of a base 4 from which a tubular head rises, the head being slightly greater in diameter near its upper end than at points adjacent to the base, and having a part 5 rolled over and extending downwardly within the outer wall of the head to form a well rounded upper edge.

Figure 1:
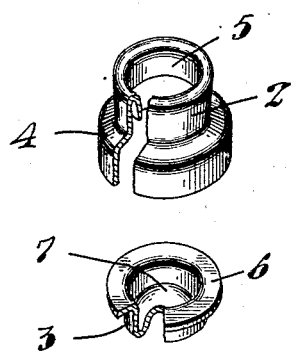
Figure 1 is a perspective view illustrating the two parts of a fastener before they have been assembled, certain of the parts being shown broken away in order better to illustrate the construction.
Figure 2:
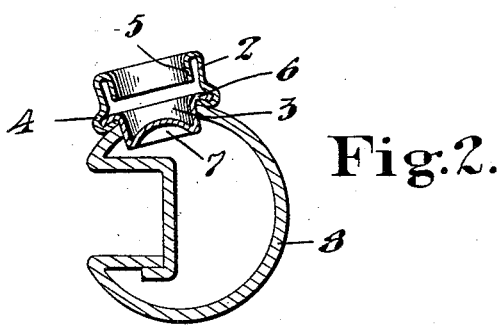
Fig. 2 is a cross-sectional view of a fastener embodying this invention and located in an article of work preparatory to being secured therein.

The shank 3 preferably is of a cup shaped form and is provided at its upper end with an outwardly extending flange 6. Its lower end is closed by a bottom 7 which, as shown in Figs. 1 and 2, is curved upwardly or bulged inwardly. Said flange and bottom are connected by a cylindrical portion of the shank.

In assembling the head and shank members of the fastener, the flange 6 of the shank is placed in the base 4, and the skirt portion of this base then is crimped over the flange 6, as shown in Fig. 2, thus locking the two parts securely together. This construction also provides an abrupt shoulder extending circumferentially around the fastener and located between its ends at the junction of said head and shank and which may be abutted against the surface to which the fastener is anchored.

Figure 3:
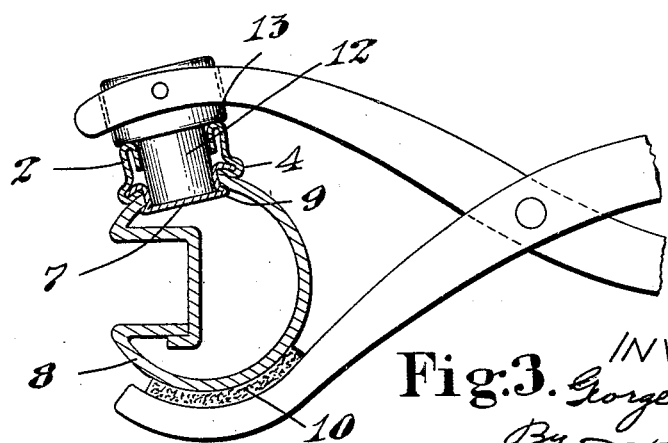
Fig. 3 is a view similar to Fig. 2 but showing the fastener after it has been secured in place.

Figs. 2 and 3 show the fastener applied to a wind shield frame 8 of an automobile. In setting the fastener in this location a tool of a special construction preferably is used. This tool is similar to a pair of pliers and the work engaging parts of it are shown in Fig. 3. One jaw of the tool carries a pad 10 of leather, felt, or the like, to engage the face of the wind shield frame opposite to that in which the fastener is set, while the opposite jaw carries a plunger 12 to enter the fastener with its lower end bearing on the inwardly bulged bottom 7 of the fastener. Pressure applied to the handles forces the plunger 12 inwardly, thus flattening the bottom 7 and this flattening action expands the lower end of the shank and produces an enlarged margin 9 which cooperates with the base 4 to secure the fastener rigidly in the work. A shoulder 13 on the plunger 12 limits the inward movement of the plunger.

It is therefore a very easy matter to set the fastener even when it is impossible to obtain access to the rearward face of the wall in which the fastener is mounted. If the nature of the work is such that a tool similar to that shown in Fig. 3 cannot be used, the fasteners can be set by using a plunger having an end portion similar to that of the plunger shown in Fig. 3 and striking this plunger with a mallet or hammer. The closed bottom of the fastener is of particular advantage when the fastener is used on a motor vehicle since it prevents the whistling which otherwise is caused at some speeds by air blowing through the aperture in the fastener. It also excludes water and dirt.

The invention thus provides a fastener of a simple construction which can be manufactured economically and which is of particular value for the purposes above described. While a preferred embodiment of the invention has been herein shown it will be understood that the invention may be embodied in other forms without departing from the spirit or scope thereof.

For example, the invention has been shown applied to a stud but under some circumstances it might also be used in the socket member, as will be obvious to those skilled in this art.

Having thus described my invention, what I desire to claim as new is:—

A snap fastener installation comprising, in combination, a rigid support having an aperture therethrough, a snap fastener member having a flange engaging the front face of said rigid support, a cup-shaped attaching portion extending from said flange through said aperture in said rigid support, said attaching portion having an imperforate annular wall and an imperforate bottom to prevent the passage of dust and moisture through said fastener member and to prevent noises and said wall portion, beyond the inner face of said rigid support, being expanded laterally by flattening a preformed hump in the bottom of said attaching portion thereby to provide the only means for attaching said snap fastener member to the rigid support in cooperation with said flange and apertured means extending from said flange and providing one of the elements of a separable snap fastener through which access may be had to the hump in the bottom of the attaching portion.

GEORGE A. HOLMES.